United States Patent
Guyer et al.

(10) Patent No.: US 9,548,682 B2
(45) Date of Patent: Jan. 17, 2017

(54) ACTUATOR WITH ELECTRIC MOTOR AND MOTOR CONTROLLER

(75) Inventors: Paul F. Guyer, Oberdürnten (CH); Atilla Beker, Wetzikon (CH); Beat Weber, Zürich (CH)

(73) Assignee: BELIMO HOLDING AG, Hinwi (CH)

( * ) Notice: Subject to any disclaimer, the term of this patent is extended or adjusted under 35 U.S.C. 154(b) by 40 days.

(21) Appl. No.: 14/001,416

(22) PCT Filed: Mar. 2, 2011

(86) PCT No.: PCT/CH2011/000038
§ 371 (c)(1),
(2), (4) Date: Sep. 30, 2013

(87) PCT Pub. No.: WO2012/116454
PCT Pub. Date: Sep. 7, 2012

(65) Prior Publication Data
US 2014/0009087 A1  Jan. 9, 2014

(51) Int. Cl.
*H02P 3/00* (2006.01)
*G05B 19/18* (2006.01)
(Continued)

(52) U.S. Cl.
CPC .............. *H02P 5/46* (2013.01); *G05B 19/414* (2013.01); *G05B 2219/42186* (2013.01); *G05B 2219/42188* (2013.01)

(58) Field of Classification Search
CPC ...................................... H02P 5/46; H02P 5/68
(Continued)

(56) References Cited

U.S. PATENT DOCUMENTS

| 4,258,552 A | 3/1981 | Ryker et al. |
| 5,004,961 A * | 4/1991 | Berner .................... E05F 15/77 318/266 |

(Continued)

FOREIGN PATENT DOCUMENTS

| CN | 1621978 A | 6/2005 |
| CN | 101128783 A | 2/2008 |

(Continued)

OTHER PUBLICATIONS

Office Action issued in corresponding Chinese Office Action No. 201180068896.1 dated May 19, 2015.
(Continued)

*Primary Examiner* — Eduardo Colon Santana
*Assistant Examiner* — Gabriel Agared
(74) *Attorney, Agent, or Firm* — Sughrue Mion, PLLC (57) ABSTRACT

An actuator (1M, 1S) with a motor (12) and a motor controller (11) is configurable to operate as a master or a slave to another actuator which is coupled mechanically for driving a common load. For the case where the actuator (1M) is set as the master, the motor controller (11) receives on an input terminal (Y3) an external position control signal (pC), generates a motor control signal (sC) for controlling the motor (12) based on the position control signal (pC), and supplies the motor control signal (sC) to an output terminal (U5) for controlling a slave. For the case where the actuator (1S) is set as the slave, the motor controller (11) controls the motor (12) by supplying to the motor (12) the motor control signal (sC) received from the master. Controlling the actuators with a master improves workload balancing and reduces damages to transmission mechanics of the actuators.

12 Claims, 6 Drawing Sheets

(51) Int. Cl.
*B25J 9/18* (2006.01)
*H02P 5/46* (2006.01)
*G05B 19/414* (2006.01)

(58) Field of Classification Search
USPC .................................. 318/53, 568.1, 568.11
See application file for complete search history.

(56) References Cited

U.S. PATENT DOCUMENTS

| | | | | |
|---|---|---|---|---|
| 5,656,903 | A * | 8/1997 | Shui | ........................ B25J 3/04 |
| | | | | 318/568.1 |
| 6,969,961 | B2 * | 11/2005 | Tolkmitt | .............. G05B 19/416 |
| | | | | 318/34 |
| 7,042,187 | B2 | 5/2006 | Nagai et al. | |
| 7,183,736 | B1 | 2/2007 | Chou et al. | |
| 7,417,386 | B2 | 8/2008 | Piefer et al. | |
| 7,446,491 | B2 | 11/2008 | OHiggins et al. | |
| 2003/0010096 | A1 | 1/2003 | Long | |
| 2003/0100961 | A1 | 5/2003 | Monse et al. | |
| 2007/0068399 | A1 * | 3/2007 | Anderson | ................. B30B 1/18 |
| | | | | 100/269.06 |
| 2007/0103437 | A1 * | 5/2007 | Rosenberg | ............. A61B 19/22 |
| | | | | 345/161 |
| 2010/0139436 | A1 * | 6/2010 | Kawashima | ......... B25J 17/0266 |
| | | | | 74/490.01 |
| 2010/0171458 | A1 | 7/2010 | Hamaguchi et al. | |

FOREIGN PATENT DOCUMENTS

| | | |
|---|---|---|
| RU | 2 326 488 C1 | 6/2008 |
| WO | 2009/083031 A1 | 7/2009 |
| WO | 2010/063512 A2 | 6/2010 |
| WO | WO 2010063512 A2 * | 6/2010 ............... B23Q 5/10 |

OTHER PUBLICATIONS

Communication dated Oct. 2, 2015 from the Russian Patent Office issued in corresponding Application No. 2013144218/08.
English Translation of Communication dated Apr. 22, 2016 from the Russian Patent Office in counterpart Application No. 2013144218/08.

* cited by examiner

ACTUATOR WITH ELECTRIC MOTOR AND MOTOR CONTROLLER

CROSS REFERENCE TO RELATED APPLICATIONS

This application is a National Stage of International Application No. PCT/CH2011/000038 filed Mar. 2, 2011, the contents of all of which are incorporated herein by reference in their entirety.

FIELD OF THE INVENTION

The present invention relates to an actuator comprising an electric motor and a motor controller. Specifically, the present invention relates to an actuator comprising an electric motor and a motor controller whereby the actuator is used to work cooperatively, i.e. in piggyback configuration, with another actuator which is coupled mechanically to the actuator for driving a common load.

BACKGROUND OF THE INVENTION

It is common practice to couple mechanically two or more actuators for driving a common load, i.e. to use two or more actuators in piggyback configuration or simply "piggybacked". For example, the actuators are mechanically coupled directly through attachment to a common drive shaft or indirectly through connecting rods, levers, bars, other linkage assemblies, or parts of the load to be driven, e.g. a damper or a valve. Typically, and depending on the type and way of the mechanical coupling of the actuators to each other and/or the common load, the materials used for the mechanical coupling, and the distances between the individual actuators, etc., the load is not equally distributed among the piggybacked actuators, the force provided by their electrical motors is not optimally used and combined, and, worst of all, as a result, gear and transmission mechanisms of the actuators are damaged in the process.

SUMMARY OF THE INVENTION

It is an object of this invention to provide an actuator which is suitable to work cooperatively with one or more other actuators which are coupled in piggyback configuration, for driving a common load, which actuator does not have at least some of the disadvantages of the prior art.

According to the present invention, these objects are achieved through the features of the independent claims. In addition, further advantageous embodiments follow from the dependent claims and the description.

According to the present invention, the above-mentioned objects are particularly achieved in that an actuator, comprising an electric motor and a motor controller, is configurable to operate as a master or a slave to another actuator which is coupled mechanically to the actuator for driving a common load. The motor controller is configured, for the case where the actuator is set as the master, to receive on an input terminal an external position control signal, to generate based on the position control signal (and the load) a motor control signal, e.g. a speed control signal or a torque control signal, to control the motor by supplying the motor control signal to the motor, and to control a slave by supplying the motor control signal to an output terminal. The motor controller is further configured, for the case where the actuator is set as the slave, to receive on the input terminal the motor control signal supplied by the master, and to control the motor by supplying the motor control signal from the master to the motor. Accordingly, two or more actuators which are coupled mechanically to drive a shared load follow the control signal of one common controller which is implemented on the actuator which is set up as the master and perceives a force feedback from the slave actuators through the mechanical coupling. Thus, inherent in the speed control signal provided by the master actuator to the slave actuator(s) is not only the speed at which the actuators are controlled to run, but also the momentum, or vice versa. Thereby, counter-productive work is avoided, the work load is balanced more equally among the piggybacked actuators, and more cooperative and efficient work load sharing is achieved and energy can be conserved, without damage to gear and transmission mechanics of the actuators, because the actuators drive their common load in the same direction and do not work against each other.

In a preferred embodiment, the motor controller is further configured to measure, at start-up time, voltage levels at the input terminal, and to set the actuator as a slave depending on the voltage levels measured at the input terminal. Automatic detection of a slave mode, based on voltage levels at an input terminal, makes it possible to set up an actuator as a slave simply through corresponding wiring of the slave actuator, provided the defined voltage levels are supplied by the master actuator or another external control system, for example.

In another preferred embodiment, the motor controller is further configured to reduce the impedance of the input terminal, for the case where the actuator is set as a slave. Furthermore, the motor controller is configured to detect at the output terminal a voltage reduction caused by a lowered impedance of another actuator connected to the output terminal, and to set the actuator as the master upon detecting the voltage reduction at the output terminal. Automatic detection of a master mode, based on an interrupt which is indicated by an abrupt voltage reduction caused by a lowered impedance level of a unit connected to the output terminal, makes it possible to set up an actuator as a master simply through corresponding wiring of the master actuator, provided the impedance level is lowered accordingly by one or more slave actuators or another external unit, for example.

In a preferred embodiment, the motor controller is further configured to set, at start-up time, a defined first voltage level at the output terminal, and to set a defined second voltage level at the output terminal, upon having been set as the master, the defined second voltage level being different from the first voltage level. Providing a different, e.g. reduced or increased, voltage level by the master actuator at the output terminal makes it possible for an actuator, which has its input terminal as a slave connected to the output terminal of the master actuator, to detect more reliably that it is indeed set up as a slave actuator connected to the master actuator.

In an embodiment, the motor controller is further configured, for the case where the actuator is set as a slave, to provide on the output terminal a position signal indicating a current actuator position. The position signal makes it possible to indicate to an external control system the actual and current positions of the actuator(s).

In an embodiment, the actuator further comprises one or more stored actuator parameters, e.g. a speed parameter and/or a torque parameter, and the motor controller is configured to generate the motor control signal based on the actuator parameters and the position control signal (and the load). Accordingly, one external position control signal can be supplied to different types of actuators or motors respectively, which have different actuator parameters stored for mapping the external position control signal internally to the appropriate motor control signal.

In an embodiment, the actuator is further configurable to operate as a stand-alone actuator, and the motor controller is further configured, for the case where the actuator is set as a stand-alone actuator, to receive on the input terminal the external position control signal, to generate based on the position control signal (and the load) the motor control signal, to control the motor by supplying the motor control signal to the motor, and to provide on the output terminal a position signal indicating a current actuator position. Thus, the same type of actuator can be used in master mode, in slave mode, or in stand-alone mode, simply by corresponding configuration, e.g. by corresponding wiring.

In another embodiment, the actuator further comprises a terminal box, the terminal box houses the electrical terminals of the actuator and has breakthrough areas for feeding electrical wires through the terminal box to the electrical terminals.

In another embodiment, the actuator further comprises manual control elements which are enclosed by the terminal box.

Preferably, the terminal box has a removable lid, whereby in a closed position, the removable lid is configured to protect the electrical terminals from splash liquid, and, in an open position, enabled is access to the electrical terminals and/or to the manual control elements.

In an embodiment, the actuator further comprises a mechanical interface with two openings on opposite sides for receiving a drive shaft. The mechanical interface has arranged at one of the openings a fastener for coupling the drive shaft to the electric motor, and one or more support rings inserted into the opposite one of the openings and configured to receive the drive shaft and to reduce lateral movement of the drive shaft with respect to a drive axis running through the two openings.

In yet another embodiment, the actuator further comprises an anti-rotation member arranged on a face of the actuator, and the support rings are inserted in the one of the openings that is arranged on the face of the actuator having the anti-rotation member arranged thereon. The supporting insert rings prevent or at least reduce lateral movement of the drive shaft that would otherwise result from the momentum or torque about the actuator's longitudinal axis resulting from the force of the electrical motor, particularly when the anti-rotation member and the fastener are arranged on opposite sides of the actuator.

In addition to an actuator, the present invention also relates to a method of operating the actuator and a computer program product comprising computer program code for controlling one or more processors of an actuator, preferably a computer program product comprising a tangible, non-transitory computer-readable medium having stored therein the computer program code. Specifically, the computer program code is configured to direct the one or more processors of the actuator to control the actuator to operate as a master or a slave to another actuator which is coupled mechanically to the actuator for driving a common load, whereby, for the case where the actuator is set as the master, the processor receives on an input terminal of the actuator an external position control signal, generates based on the position control signal (and the load) a motor control signal, e.g. a speed control signal or a torque control signal, controls a motor of the actuator by supplying the motor control signal to the motor, and controls the slave by supplying the motor control signal to an output terminal of the actuator; and whereby, for the case where the actuator is set as the slave, the processor receives on the input terminal the motor control signal supplied by the master, and controls the motor by supplying the motor control signal from the master to the motor.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
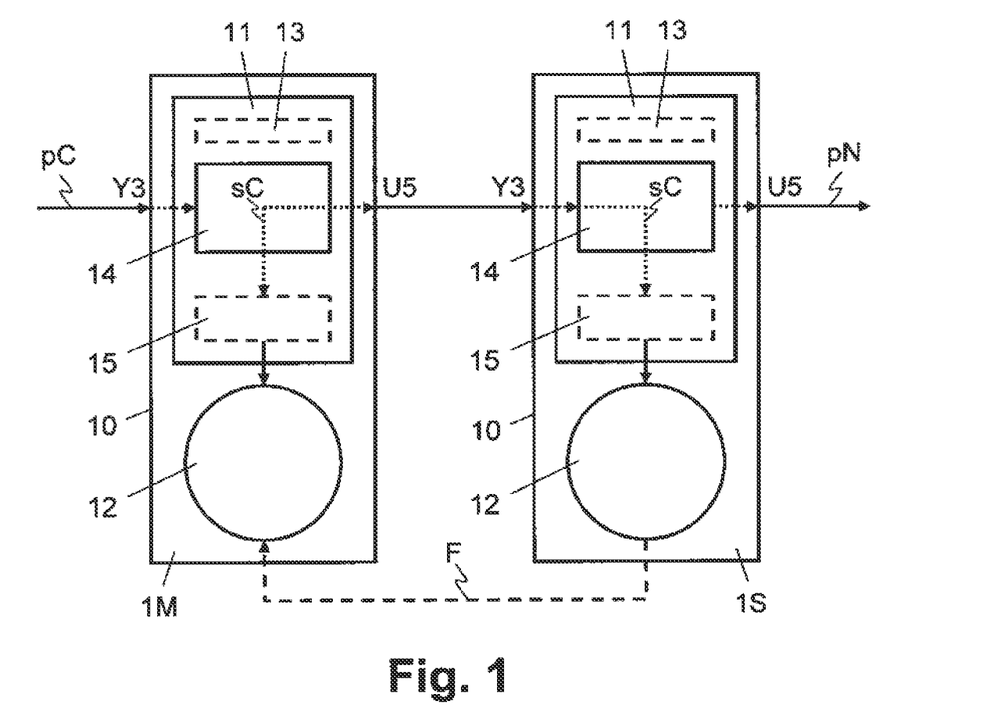
FIG. 1 shows a block diagram illustrating schematically two actuators which are coupled mechanically to drive a common load and set up in a master/slave configuration.
Figure 2:
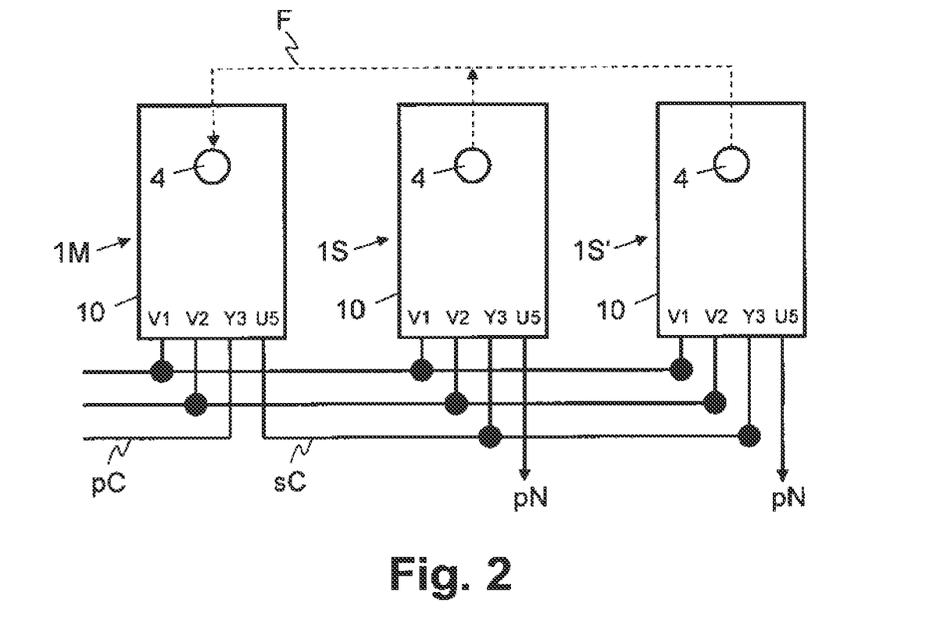
FIG. 2 shows a block diagram illustrating schematically three actuators which are wired and set up in a master/slave configuration to drive a common load.

In FIGS. 3, 4, 5, 6, and 7, reference numeral 1 refers to an actuator. In FIGS. 1 and 2, corresponding actuators 1 are designated with reference numerals 1M, 1S or 1S', respectively, the reference numeral 1M referring to an actuator 1 configured as a master, and reference numerals 1S, 1S' referring to actuators 1 configured as slaves. As will be described later in more detail, preferably, configuration of an actuator 1 is determined dynamically and automatically; however, one skilled in the art will understand, that, alternatively, a slave or master mode can be set manually for an actuator 1, e.g. by setting jumpers or entering a mode parameter through operating elements, etc. For example, parameterization and setting of master or slave modes, respectively, can be set via a communication interface, e.g. a communication bus of the actuators 1, 1M, 1S, 1S', or via an electrical terminal, e.g. output terminal U5 which will be described later prior to the wiring of the actuators 1, 1M, 1S, 1S', for example.

As illustrated schematically in FIG. 1, the actuators 1M, 1S comprise a housing 10 and, arranged in the housing, an electric motor 12 and a motor controller 11. For example, the electric motor 12 is a DC motor, particularly, a brushless DC (BLDC) motor. The motor controller 11 includes a control module 14, an optional motor task module 15 and a data store 13 having stored therein one or more actuator parameters, e.g. an optional speed parameter and/or a torque parameter. The control module 14 includes a proportionalintegral controller (PI controller) or another controller for generating a motor control signal sC, e.g. a speed control signal or a torque control signal (for controlling the motor current), in response to a position control signal pC received from an external control system via an electrical input terminal Y3 and depending on the load. In an embodiment, the control module 14 or PI controller is configured to generate the motor control signal sC from the external position control signal pC and depending on the load based on the stored actuator parameters, e.g. based on the speed parameter 13 which defines for the specific actuator 1, 1M, 1S, 1S' or its motor 12, respectively, a position-to-speed calculation factor, and/or based on a torque parameter which defines for the specific actuator 1, 1M, 1S, 1S' or its motor 12, respectively, a position-to-torque calculation factor. In different embodiments, the motor control signal sC generated by the control module 14 or PI controller, respectively, is provided directly to the motor 12 or through the optional motor task module 15 which is implemented as a (motor) ASIC, for example, and periodically receives, e.g. every 10 ms, from the control module 14 or PI controller, respectively, the motor control signal sC. Moreover, the control module 14 includes a mode detector configured to detect whether the actuator 1, 1M, 1S, 1S' is arranged in a non-piggybacked setting (i.e. in conventional stand-alone mode), or whether it is set up as a master (i.e. in master mode) or a slave (i.e. in slave mode) in a piggyback configuration with one or more additional actuators 1, 1M, 1S, 1S', as will be explained later in more detail.

In an embodiment, the actuator 1, 1M, 1S, 1S' includes two separable units with separate housings which can be coupled electrically for exchanging control signals; one unit comprises the motor 12 and the motor task module 15, whereas the other unit comprises the mode detector. Depending on the embodiment, the PI controller or other controller for generating the motor control signal sC and the data store 13 with the actuator parameters are implemented in the first unit, together with the motor 12, or in the other unit, together with the mode detector.

The functional modules of the motor controller 11, including the control module 14, PI controller, mode detector and the optional motor task module 15, are implemented as programmed software modules which direct one or more processors, as another programmed logic unit, e.g. an application-specific integrated circuit (ASIC), or fully or partly by way of discrete hardware components.

Figure 6:
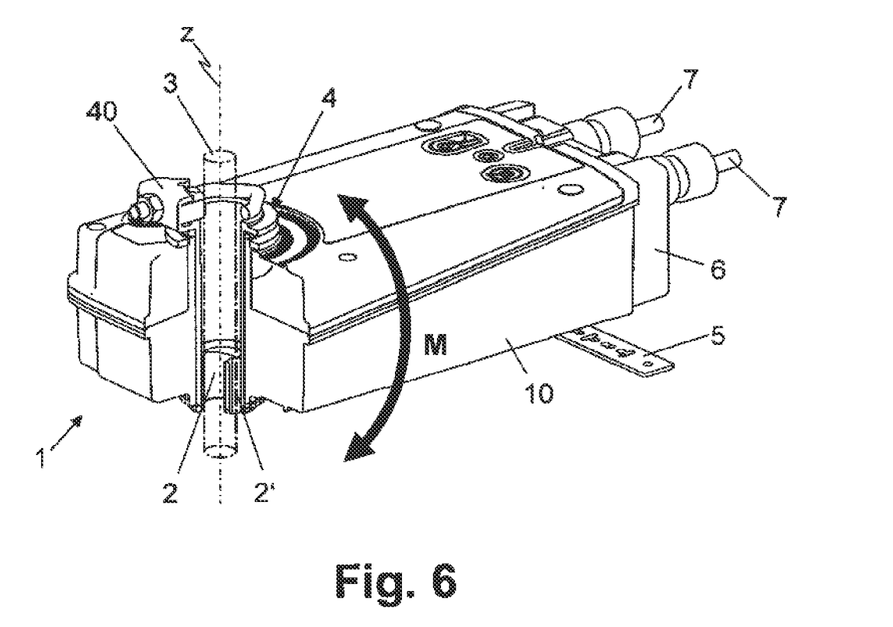
FIG. 6 shows a view of the actuator with a cut-out section illustrating a mechanical interface for receiving and coupling a drive shaft to the motor of the actuator.
Figure 7:
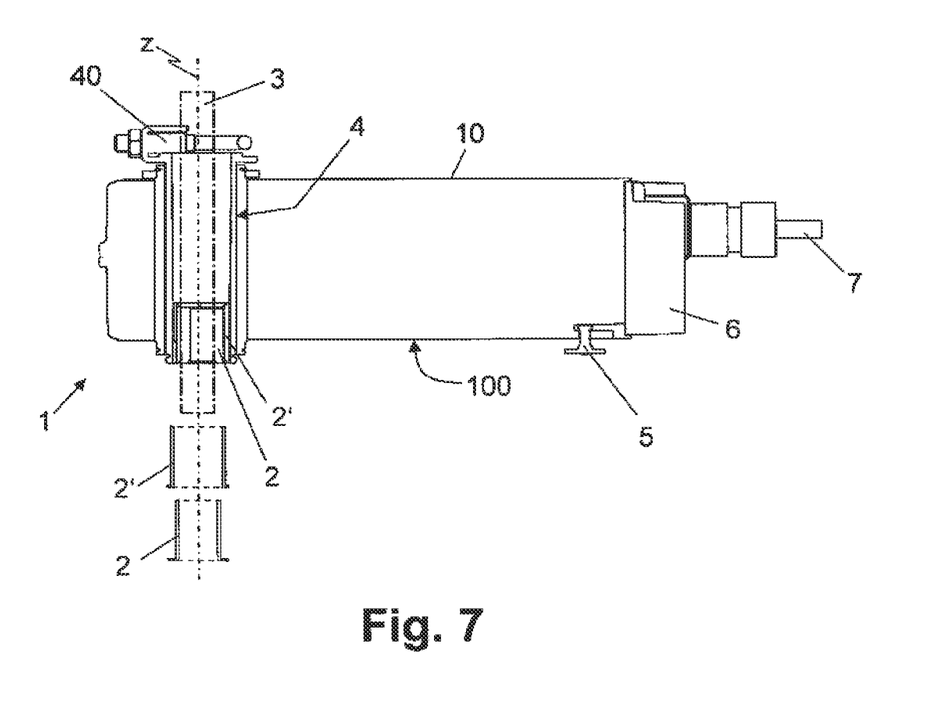
FIG. 7 shows a longitudinal cross section of the actuator illustrating the mechanical interface for receiving and coupling the drive shaft with the motor.

As illustrated in FIGS. 6 and 7, the actuators 1 comprise a mechanical interface 4, with an annular opening or bore running concentrically to drive axis z through the actuator 1, for receiving a drive shaft 3, e.g. a cylindrical drive axle of a mechanical load L such as a valve or a damper. The mechanical interface 4 comprises mechanical fastening means 40, i.e. a fastener such as a clamp, pin or bolt connector, for fastening and mechanically coupling the drive shaft 3 to the electrical motor 12. Furthermore, the actuator 1 is provided with one or more tubular or ring-shaped support elements, essentially in the form of a hollow cylinder, hereafter referred to as support rings 2, 2' for short, which are inserted into the opening of the mechanical interface 4, opposite to the opening where the fastening means 40 are arranged. These support rings 2, 2' fill in the gap between the drive shaft 3 and the wall of the mechanical interface 4 and reduce slackness and lateral movement of the drive shaft 3 with respect to the drive axis z. The support rings 2, 2' are removable and come in different and/or variable diameters and thicknesses depending on the diameter of the drive shaft 3. In an embodiment, the surface of the support rings 2, 2' are ripped or teethed, for example. As shown in FIGS. 6 and 7, the actuator 1 is also provided with an anti-rotation member 5 arranged on a face 100 of the actuator 1 or its housing 10, respectively. The anti-rotation member 5 is attached to the actuator 1 and extends beyond the width of the actuator 1. It has one or more bores for fixing the actuator 1 to a support structure, such as a wall, a beam, a post or a pipe, for example. In installation scenarios where the anti-rotation member 5 and the fastening means 40 are arranged on opposite faces or sides of the actuator 1 or its housing 10, respectively, the support rings 2, 2' prevent or at least reduce lateral movement of the drive shaft 3 that would otherwise result from the momentum M or torque about the actuator's longitudinal axis resulting from the force of the electrical motor 12. In alternative embodiments, the anti-rotation member 5 is implemented in form of one or more pins or screws, for example.

Figure 4:
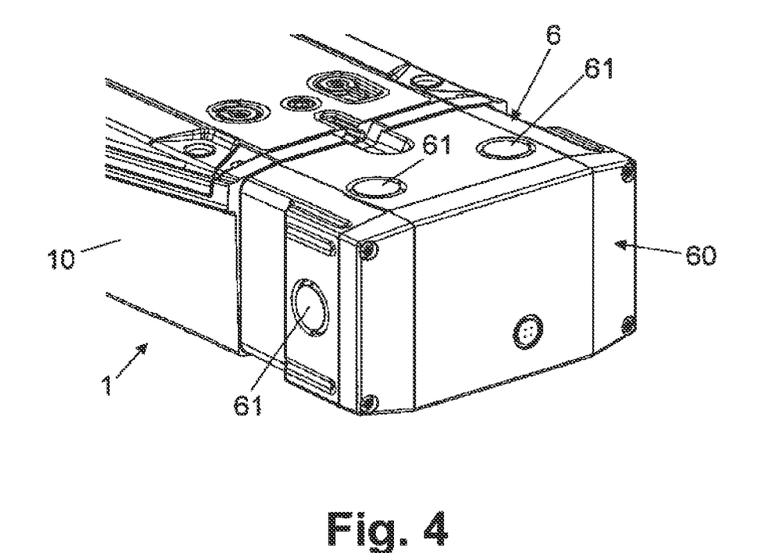
FIG. 4 shows a partial view of an actuator having a terminal box which houses the electrical terminals of the actuator and has a closed lid.
Figure 5:
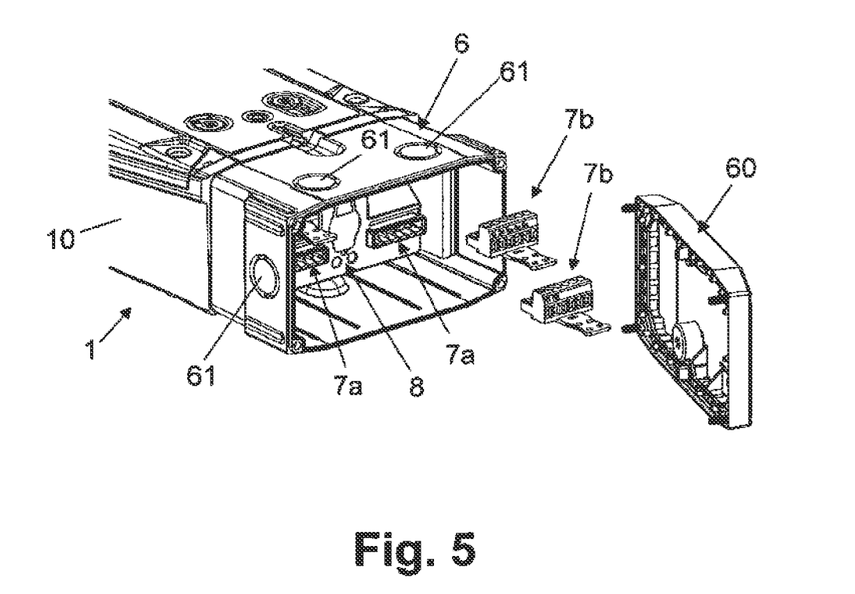
FIG. 5 shows the partial view of the actuator in a state where the lid of the terminal box is open.

As illustrated in FIGS. 4 and 5, the actuators 1 further comprise a terminal box 6 which houses the electrical terminals 7a, 7b of the actuator 1. The terminal box 6 has a four-sided wall that encloses the electrical terminals 7a, 7b and is either attached to the remaining housing 10 of the actuator 1 or formed as an integral part of the housing 10. The electrical terminals 7a are fixed to the actuator 1 and receive the connection wires 7 directly or by way of connection terminals 7b. Accordingly, terminals 7a are configured as receptacles whereas terminals 7b are configured as connectors which can be plugged into the receptacle. The terminal box 6 further comprises a lid 60 for opening the terminal box 6 to get access to the electrical terminals 7a, 7b and optional operating elements 8 which are also arranged in the terminal box 6. Depending on the embodiment, for opening the terminal box 6, the lid 60 is removed entirely from the terminal box 6 or it is rotated about an axle of a hinge by which the lid 60 is attached to the terminal box 6. In its closed state, the lid 60 is fastened and secured to the wall of the terminal box 6 by way of screws, clamps or other fastening means. In an embodiment, a surrounding sealing ring is arranged on the lid 60 and/or on the wall of the terminal box 6 for sealing the gap between the wall of the terminal box 6 and lid 60. The terminal box 6 further comprises a plurality of breakthrough areas 61 for feeding electrical wires 7 through the wall of the terminal box 6 for connecting the wires 7 to the electrical terminals 7a, 7b. The wires 7 are run through a breakthrough 61 directly or by way of a sealing cable connector that further prevents splash water from entering the terminal box 6. Preferably, to increase flexibility in arranging, installing and electrically wiring the actuator 1, one or more breakthrough areas 61 are provided on all side walls of the terminal box 6 so that an opening can be broken through the wall or lid 60 of the terminal box 6 wherever it is needed or convenient in the particular set up.

As shown in FIG. 2, the electrical terminals include at least two power supply terminals V1, V2, an input terminal Y3 for receiving control signals, and an output terminal U5 for providing an output or a feedback signal.

Figure 3:
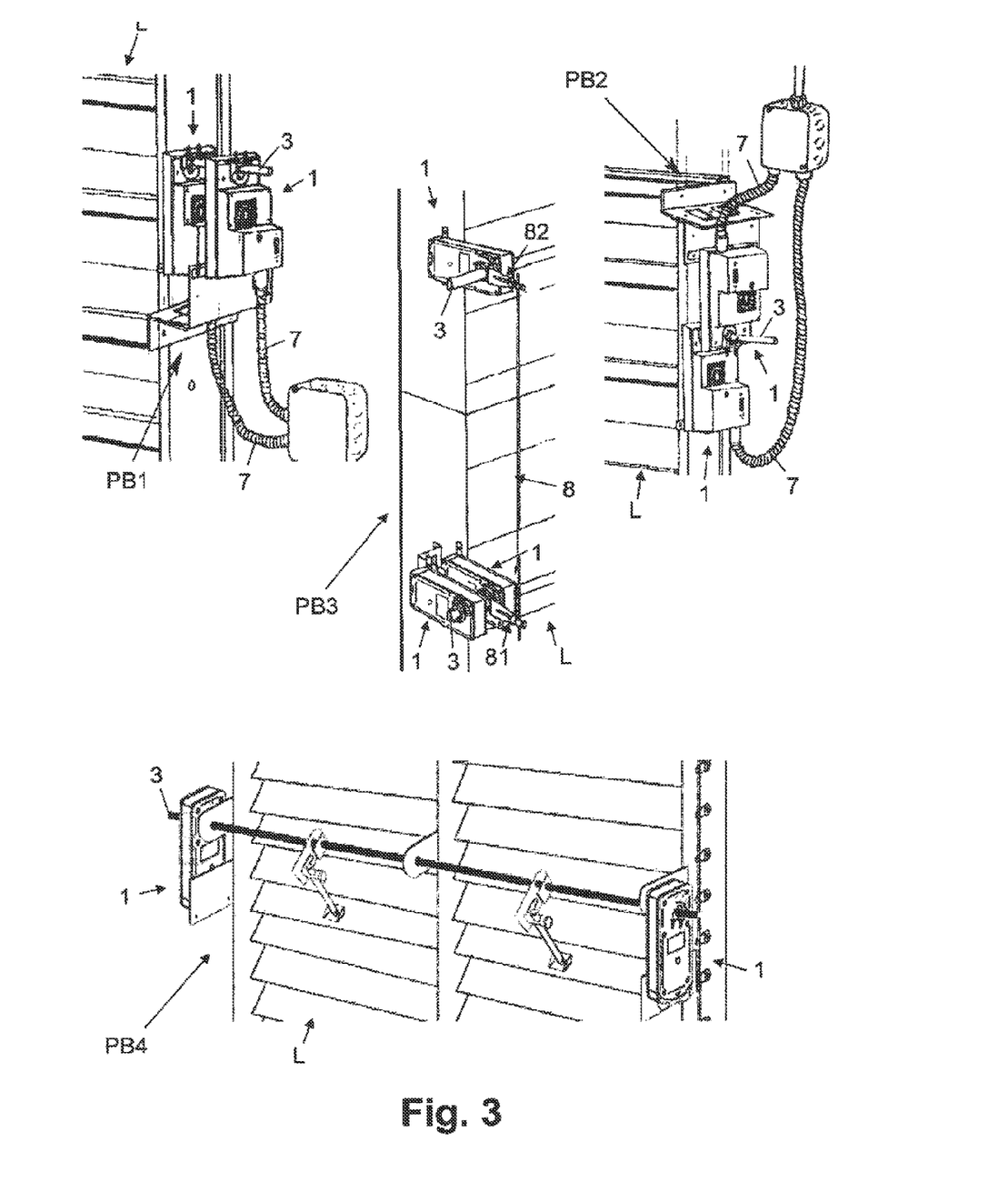
FIG. 3 shows different examples of piggybacking two or more actuators to drive a common mechanical load.

FIG. 3 illustrates different examples of two or more actuators 1 which are arranged in a piggyback configuration for driving a common load L. Specifically, the piggybacked actuators 1 are coupled mechanically to drive the common load L cooperatively. Reference numeral PB1 refers to a piggyback scenario where two actuators 1 are stacked on top of each other with equal orientation and coaxial alignment of their mechanical interfaces 4 such that the drive shaft 3 of the mechanical load L, here a damper, runs through the mechanical interfaces 4 of both actuators 1. In piggyback scenario PB2, the two actuators 1 are arranged with a 180° opposite orientation, overlapping only with their coaxially arranged mechanical interfaces 4 such that the drive shaft 3 runs through both mechanical interfaces 4. In piggyback scenario PB3, three actuators 1 are involved; two of the three actuators 1 are arranged as in scenario PB1 and drive a first lever 81 attached to a drive shaft running through their mechanical interfaces 4; the third actuator 1 is arranged separate from the other two actuators and drives a second lever 82. The three actuators 1 of piggyback scenario PB3 are coupled mechanically in that the two levers 81, 82 are linked by a bar to drive the common load L. In piggyback scenario PB4, two actuators 1 are arranged on opposite sides of their common load L, here a damper, and have a drift shaft 3, which is coupled to the mechanical load L, run through their mechanical interfaces 4. One skilled in the art will understand that there are numerous other ways of mechanically coupling two or more actuators 1 for driving a common load L cooperatively, i.e. in piggyback configuration.

FIGS. 1 and 2 show actuators 1M, 1S, 1S' which are mechanically coupled in a piggyback scenario whereby in each case one of the actuators 1M is set up as a master (actuator) of the other actuators 1S, 1S' which are set up in each case as a slave (actuator). Specifically, the master actuator 1M has its input terminal Y3 connected to an external control system for receiving a position control signal pC. Furthermore, the output terminal U5 of the master actuator 1M is connected to the input terminal(s) Y3 of the slave actuator(s) 1S, 1S' for transferring to the slave actuators 1S, 1S' a motor control signal sC. The output terminal U5 of the slave actuators 1S, 1S' are connected, for example, to the external control system for providing a position indicator (feedback) signal pN. In FIGS. 1 and 2, arrow F represents schematically the mechanic coupling or force feedback of the piggybacked slave actuators 1S, 1S' to the master actuator 1M. The power supply terminals V1, V2 of the actuators 1M, 1S, 1S' are wired in parallel to an external power source.

Figure 8:
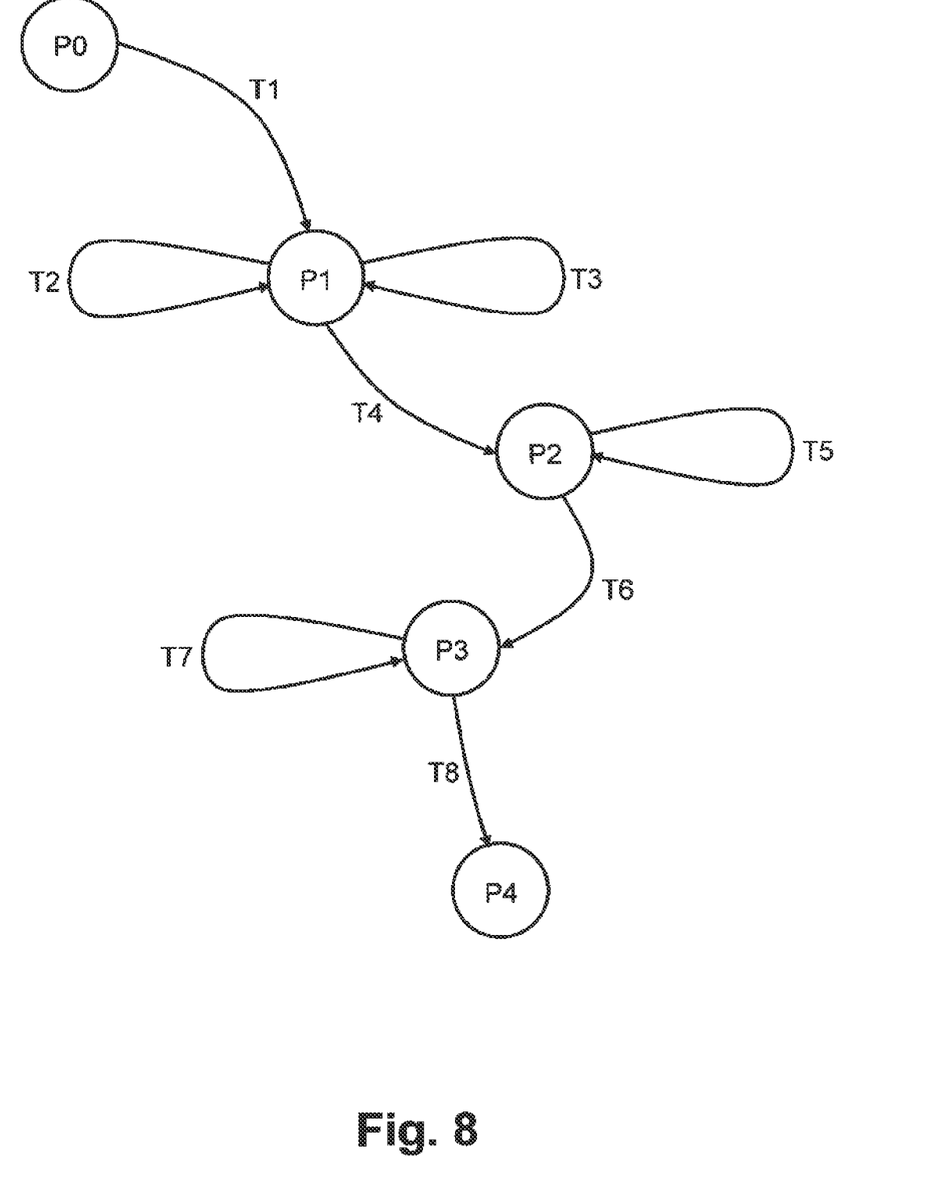
FIG. 8 shows a state diagram illustrating an exemplary sequence of transitions for detecting in an actuator that it is set up as a master.
Figure 9:
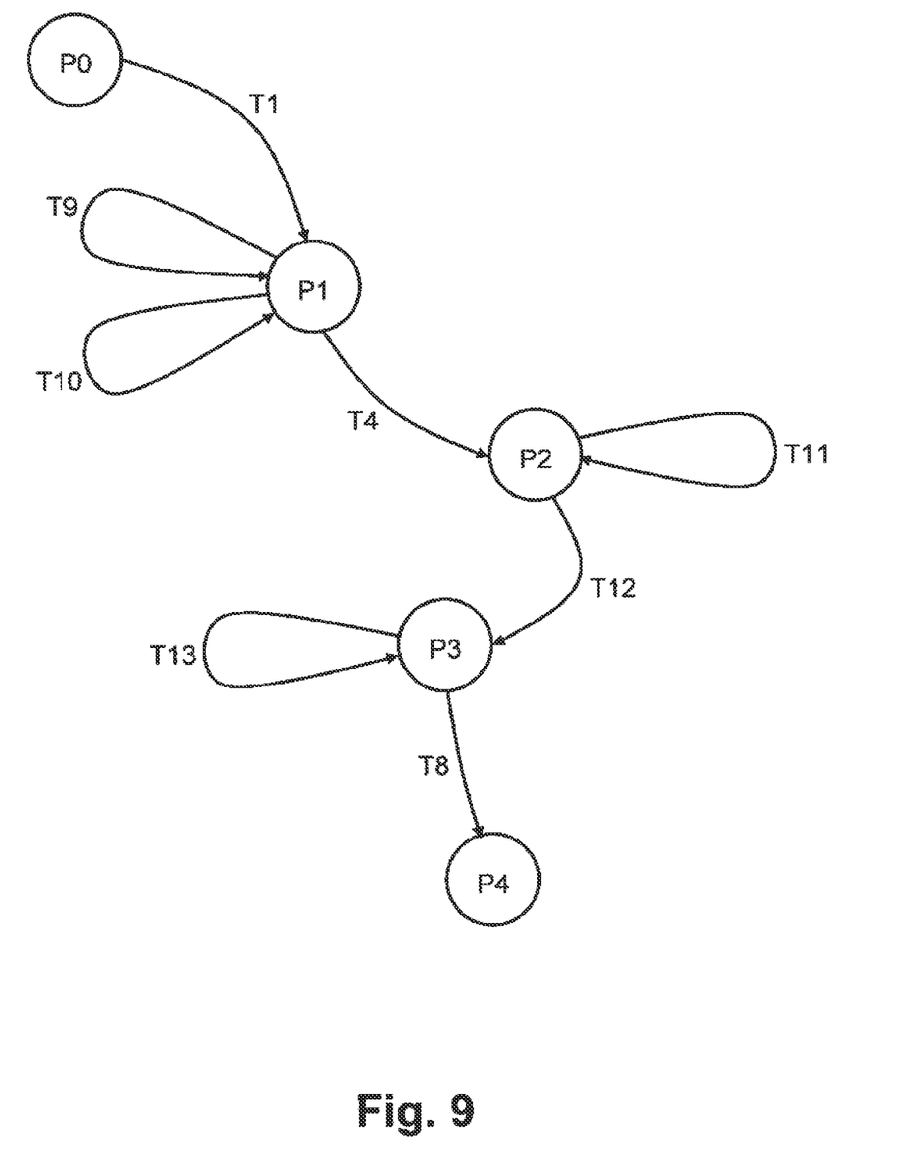
FIG. 9 shows a state diagram illustrating an exemplary sequence of transitions for detecting in an actuator that it is set up as a slave.

In the following paragraphs, described with reference to FIGS. 8 and 9 are possible sequences of steps and state transitions performed by the functional modules of the actuators 1, 1M, 1S, 1S' for detecting whether the actuator 1, 1M, 1S, 1S' is set up in stand-alone mode (no piggyback), or in a piggyback configuration in either master mode or slave mode.

FIG. 8 illustrates a sequence of steps and transitions T1, T2, T3, T4, T5, T6, T7, T8 (T1-T8) between different phases P0, P1, P2, and P4 (P0-P4) for detecting in an actuator 1, 1M that it is configured and set up as a master.

FIG. 9 illustrates a sequence of steps and transitions T1, T9, T10, T4, T11, T12, T13, T8 between the different phases P0-P4 for detecting in an actuator 1, 1S, 1S' that it is configured and set up as a slave.

In the initial start-up phase P0, when the actuator 1, 1M, 1S, 1S' is powered up, a defined initial control voltage, e.g. 9V, is provided at the output terminal U5 of the actuator 1, 1M, 1S, 1S', e.g. by the motor controller 11 or control module 14, respectively. After a defined initialization time, e.g. 200 ms, the control module 14 or mode detector, respectively, sets a phase timer to a defined duration of time for phase P1, e.g. 800 ms, and moves the actuator 1, 1M, 1S, 1S', in transition T1, from phase P0 to phase P1.

In phase P1, the control module 14 or mode detector of the actuator 1, 1M, 1S, 1S', respectively, checks periodically the voltage level at its input terminal Y3. If the actuator 1, 1S, 1S' is wired as a slave, the defined initial control voltage, e.g. 9V, will be measured at its input terminal Y3, and, as illustrated in FIG. 9, in transition T9, the control module 14 or mode detector, respectively, sets a slave indicator to true and reduces the phase timer to a reduced duration of time for phase P1, e.g. 400 ms. Subsequently, if the defined initial control voltage, e.g. 9V, is measured again at the input terminal Y3 when the slave indicator is already set to true, in transition T10, the phase timer for the remaining duration of the time for phase P1 is set to zero.

Once the defined duration of time for phase P1 has expired, in transition T4, the actuator 1, 1M, 1S, 1S' is moved from phase P1 to phase P2 by its control module 14 or mode detector, respectively.

In phase P2, if the slave indicator is set to true, in transition T11, the control module 14 or mode detector, respectively, reduces the impedance of the actuator's input terminal Y3 to a reduced level, e.g. from an initial 100 kΩ down to 1 kΩ. The impedance level is reduced for a brief duration of time, e.g. for 100 ms. Reducing the impedance level of the actuator's input terminal Y3 will cause the voltage level at the output terminal U5 of the master actuator 1M wired to the slave actuator 1S, 1S' to drop abruptly. Subsequently, e.g. after a defined duration of time, in transition T12, the actuator 1, 1S, 1S' is moved to phase P3 by its control module 14 or mode detector, respectively, and the phase timer is set to a defined duration of time for phase P3, e.g. 600 ms.

In phase P1, if the actuator 1M is wired as a master, it remains in phase P1 and provides the defined control voltage at its output terminal U5, as indicated in FIG. 8 by transition T2, as long as there is no interrupt and the phase timer has not yet expired for phase P1. However, its control module 14 or mode detector will detect the abrupt drop of the voltage level at its output terminal U5 as an interrupt signalled by one or more slave actuators 1S, 1S'. Consequently, as illustrated in FIG. 8, in transition T3, the control module 14 or mode detector of the actuator 1M sets a mode indicator to "master mode" and sets the phase timer for the remaining duration of the time for phase P1 to zero. Consequently, in transition T4, the master actuator 1M is moved from phase P1 to phase P2 by its control module 14 or mode detector, respectively.

In phase P2, if the mode indicator is set to "master mode", in transition T5, the control module 14 or mode detector of the master actuator 1M, respectively, reduces the voltage level at its output terminal U5 to a reduced control voltage level, e.g. 7V. Subsequently, e.g. after a defined duration of time, in transition T6, the actuator 1M is moved to phase P3 by its control module 14 or mode detector, respectively, and the phase timer is set to a defined duration of time for phase P3, e.g. 600 ms. While in phase P3, the reduced control voltage level, e.g. 7V, is maintained at the output terminal U5 of the actuator 1M, if its mode indicator is set to "master mode".

In phase P3, if the slave indicator is set to true, the control module 14 or mode detector of the actuator 1, 1S, 1S', respectively, checks periodically the voltage level at its input terminal Y3. If the actuator 1, 1S, 1S' is wired as a slave, the reduced control voltage, e.g. 7V, will be measured at its input terminal Y3, and, as illustrated in FIG. 9, in transition T13, the control module 14 or mode detector, respectively, sets the mode indicator to "slave mode".

It should be mentioned that the example presented herein describes merely the detection or indication of a slave based on a reduction of the control voltage level; however, one skilled in the art will understand that different patterns are possible which include one or more reductions and/or increases of the control voltage level.

Once the defined duration of time for phase P3 has expired, in transition T8, the actuator 1, 1M, 1S, 1S' is moved from phase P3 to phase P4 by its control module 14 or mode detector, respectively.

In phase P4, the actuator 1, 1M, 1S, 1S' starts operating as a master or slave, if its mode indicator is set to "slave mode" or master mode", respectively; otherwise, it operates as a conventional stand-alone actuator that is not configured in piggyback configuration. In an embodiment with an additional possibility for manual and/or communication-based parameterization of an actuator as master or slave, the decision about the respective mode is taken in phase P4, after completion of the mode detection algorithm through phases P1, P2, P3 to P4.

In "master mode", the control module 14 of the master actuator 1M activates its PI controller. The PI controller receives or measures at the actuator's input terminal Y3 the position control signal pC provided by the external control system and generates a motor control signal sC, e.g. a speed control signal or a torque control signal, based on the received position control signal pC and the load. For example, the motor control signal is generated as a pulse width modulation (PWM) signal. The control module 14 provides the generated motor control signal sC to its internal motor 12, directly or via the motor task module 15, and to its output terminal U5.

In "slave mode", the control module 14 of the slave actuator 1S, 1S' deactivates its PI controller. The control module 14 receives or measures at the actuator's input terminal Y3 the motor control signal sC provided by the master actuator 1M and provides the received motor control signal sC to its internal motor 12, directly or via the motor task module 15. Furthermore, in "slave mode", the control module 14 of the slave actuator 1S, 1S' provides to its output terminal U5 a position indicator (feedback) signal pN.

In "stand-alone mode", the control module 14 of the actuator 1 activates its PI controller to generate the motor control signal sC based on the position control signal pC received at its input terminal Y3 from the external control system and depending on the load. The control module 14 provides the generated motor control signal sC to its internal motor 12, and provides to its output terminal U5 the position indicator (feedback) signal pN.

It should be noted that, in the description, the computer program code has been associated with specific functional modules and the sequence of the steps or transitions has been presented in a specific order, one skilled in the art will understand, however, that the computer program code may be structured differently and that the order of at least some of the steps or transitions could be altered, without deviating from the scope of the invention.

The invention claimed is:

1. An actuator (1, 1M, 1S, 1S') comprising,
an electric motor (12), and
a motor controller (11), wherein
the actuator (1, 1M, 1S, 1S') is switchably configurable by being dynamically and automatically set to operate as either a master or a slave to another actuator (1, 1M, 1S, 1S') which is coupled mechanically to the actuator (1, 1M, 1S, 1S') for driving a common load (L);
the motor controller (11) is configured, for the case where the actuator (1M) is dynamically and automatically set as the master, to receive on an input terminal (Y3) an external position control signal (pC), to generate based on the position control signal (pC) a motor control signal (sC), to control the motor (12) by supplying the motor control signal (sC) to the motor (12), and to control a slave by supplying the motor control signal (sC) to an output terminal (U5); and
the motor controller (11) is further configured, for the case where the actuator (1S, 1S') is dynamically and automatically set as the slave, to receive on the input terminal (Y3) the motor control signal (sC) supplied by the master, and to control the motor (12) by supplying the motor control signal (sC) from the master to the motor (12),
wherein the motor controller (11) is further configured to measure, at start-up time, voltage levels at the input terminal (Y3), and to set the actuator (1S, 1S') as a slave depending on the voltage levels measured at the input terminal (Y3), and
wherein the motor controller (11) is further configured to reduce the impedance of the input terminal (Y3), to detect at the output terminal (U5) a voltage reduction caused by a lowered impedance of another actuator (1S, 1S') connected to the output terminal (U5), and to set the actuator (1M) as the master upon detecting the voltage reduction at the output terminal (U5).

2. The actuator (1, 1M, 1S, 1S') of claim 1, wherein the motor controller (11) is further configured to set, at start-up time, a defined first voltage level at the output terminal (U5), and to set a defined second voltage level at the output terminal (U5), upon having been set as the master, the defined second voltage level being different from the first voltage level.

3. The actuator (1, 1M, 1S, 1S') of claim 1, wherein the motor controller (11) is further configured, for the case where the actuator (1S, 1S') is set as a slave, to provide on the output terminal (U5) a position signal (pN) indicating an actuator motor position.

4. The actuator (1, 1M, 1S, 1S') of claim 1, wherein the actuator (1, 1M, 1S, 1S') further comprises one or more stored actuator parameters; and the motor controller (11) is further configured to generate the motor control signal (sC) based on the actuator parameters and the position control signal (pC).

5. The actuator (1, 1M, 1S, 1S') of claim 1, wherein the actuator (1) is further configurable to operate as a stand-alone actuator (1); and the motor controller (11) is further configured, for the case where the actuator (1) is set as a stand-alone actuator (1), to receive on the input terminal (Y3) the external position control signal (pC), to generate based on the position control signal (pC) the motor control signal (sC), to control the motor (12) by supplying the motor control signal (sC) to the motor (12), and to provide on the output terminal (U5) a position signal (pN) indicating a current actuator position.

6. The actuator (1, 1M, 1S, 1S') of claim 1, further comprising a terminal box (6), the terminal box (6) housing electrical terminals (7a) of the actuator (1, 1M, 1S, 1S') and having breakthrough areas (61) for feeding electrical wires (7) through the terminal box (6) to the electrical terminals (7a).

7. The actuator (1, 1M, 1S, 1S') of claim 6, wherein the actuator (1, 1M, 1S, 1S') further comprises manual control elements (8) enclosed by the terminal box (6) terminal.

8. The actuator (1, 1M, 1S, 1S') of claim 6, wherein the terminal box (6) has a removable lid (60), the removable lid (60), in a closed position, protecting the electrical terminals (7a) from splash liquid, and, in an open position, enabling access to at least one of: electrical terminals (7a) and manual control elements (8).

9. The actuator (1, 1M, 1S, 1S') of claim 1, further comprising a mechanical interface (4) with two openings on opposite sides for receiving a drive shaft (3), the mechanical interface (4) having arranged at one of the openings a fastener (40) for coupling the drive shaft (3) to the electric motor (12), and having inserted into the opposite one of the openings one or more support rings (2, 2') configured to receive the drive shaft (3) and reduce lateral movement of the drive shaft (3) with respect to a drive axis (z) running through the two openings.

10. The actuator (1, 1M, 1S, 1S') of claim 9, wherein the actuator (1, 1M, 1S, 1S') further comprises an anti-rotation member (5) arranged on a face (100) of the actuator (1, 1M, 1S, 1S'), and the support rings (2, 2') are inserted in the one of the openings that is arranged on the face (100) of the actuator (1, 1M, 1S, 1S') having the anti-rotation member (5) arranged thereon.

11. A computer program product comprising a non-transitory computer readable medium having stored therein computer program code which directs a processor of an actuator (1, 1M, 1S, 1S') to:

control the actuator (1, 1M, 1S, 1S') to be switchably configurable by being dynamically and automatically set between being a master or a slave to another actuator (1, 1M, 1S, 1S') which is coupled mechanically to the actuator (1, 1M, 1S, 1S') for driving a common load (L), whereby, for the case where the actuator (1M) is dynamically and automatically set as the master, the processor receives on an input terminal (Y3) of the actuator (1M) an external position control signal (pC), generates based on the position control signal (pC) a motor control signal (sC), controls a motor (12) of the actuator (1M) by supplying the motor control signal (sC) to the motor (12), and controls the slave by supplying the motor control signal (sC) to an output terminal (U5) of the actuator (1M); and whereby, for the case where the actuator (1, 1S, 1S') is dynamically and automatically set as the slave, the processor receives on the input terminal (Y3) the motor control signal (sC) supplied by the master, and controls the motor (12) by supplying the motor control signal (sC) from the master to the motor (12), wherein the motor controller (11) is further configured to measure, at start-up time, voltage levels at the input terminal (Y3), and to set the actuator (1S, 1S') as a slave depending on the voltage levels measured at the input terminal (Y3), and wherein the motor controller (11) is further configured to reduce the impedance of the input terminal (Y3), to detect at the output terminal (U5) a voltage reduction caused by a lowered impedance of another actuator (1S, 1S') connected to the output terminal (U5), and to set the actuator (1M) as the master upon detecting the voltage reduction at the output terminal (U5).

12. A method for operating an actuator (1, 1M, 1S, 1S') which comprises an electric motor (12) and a motor controller (11), the method comprising:

controlling the actuator (1, 1M, 1S, 1S') to be switchably configurable by being dynamically and automatically set between being a master or a slave to another actuator (1, 1M, 1S, 1S') which is coupled mechanically to the actuator (1, 1M, 1S, 1S') for driving a common load (L);

whereby, for the case where the actuator (1M) is dynamically and automatically set as the master:

receiving on an input terminal (Y3) of the actuator (1M) an external position control signal (pC), generating based on the position control signal (pC) a motor control signal (sC), controlling a motor (12) of the actuator (1M) by supplying the motor control signal (sC) to the motor (12), and controlling the slave by supplying the motor control signal (sC) to an output terminal (U5) of the actuator (1M); and whereby, for the case where the actuator (1, 1S, 1S') is dynamically and automatically set as the slave:

receiving on the input terminal (Y3) the motor control signal (sC) supplied by the master, and controlling the motor (12) by supplying the motor control signal (sC) from the master to the motor (12), wherein the motor controller (11) is further configured to measure, at start-up time, voltage levels at the input terminal (Y3), and to set the actuator (1S, 1S') as a slave depending on the voltage levels measured at the input terminal (Y3), and wherein the motor controller (11) is further configured to reduce the impedance of the input terminal (Y3), to detect at the output terminal (U5) a voltage reduction caused by a lowered impedance of another actuator (1S, 1S') connected to the output terminal (U5), and to set the actuator (1M) as the master upon detecting the voltage reduction at the output terminal (U5).

* * * * *